(12) United States Patent
Plummer

(10) Patent No.: US 10,145,168 B2
(45) Date of Patent: Dec. 4, 2018

(54) GLAZING UNITS WITH CARTRIDGE-BASED CONTROL UNITS

(71) Applicant: Andersen Corporation, Bayport, MN (US)

(72) Inventor: David D. Plummer, Hudson, WI (US)

(73) Assignee: ANDERSEN CORPORATION, Bayport, MN (US)

( * ) Notice: Subject to any disclaimer, the term of this patent is extended or adjusted under 35 U.S.C. 154(b) by 0 days.

(21) Appl. No.: 15/262,646

(22) Filed: Sep. 12, 2016

(65) Prior Publication Data

US 2016/0376831 A1    Dec. 29, 2016

Related U.S. Application Data

(62) Division of application No. 14/211,267, filed on Mar. 14, 2014, now abandoned.

(Continued)

(51) Int. Cl.

| | | |
|---|---|---|
| *E06B 3/67* | (2006.01) | |
| *H05K 7/14* | (2006.01) | |
| *E06B 7/28* | (2006.01) | |
| *E06B 3/66* | (2006.01) | |
| *E06B 9/24* | (2006.01) | |
| *E06B 3/663* | (2006.01) | |
| *H02S 20/20* | (2014.01) | |
| *G08C 17/02* | (2006.01) | |
| *H03K 17/96* | (2006.01) | |
| *H05K 5/00* | (2006.01) | |

(52) U.S. Cl.
CPC .................. *E06B 3/67* (2013.01); *E06B 3/66* (2013.01); *E06B 3/66309* (2013.01); *E06B 7/28* (2013.01); *E06B 9/24* (2013.01); *G08C 17/02* (2013.01); *H02S 20/20* (2014.12); *H03K 17/962* (2013.01); *H05K 5/0017* (2013.01); *H05K 7/14* (2013.01); *E06B 2009/247* (2013.01)

(58) Field of Classification Search
CPC ............................. E06B 3/67; E06B 3/66309
USPC ............. 49/501, 504, 61, 63, 125; 52/173.1, 52/786.13, 786.1, 204.5–204.72
See application file for complete search history.

(56) References Cited

U.S. PATENT DOCUMENTS 4,485,603 A * 12/1984 Derner ................ E06B 3/66342
428/34
4,692,744 A * 9/1987 Hickman ............... G08B 13/04
109/21

(Continued)

OTHER PUBLICATIONS

Jakob et al., "Active Control of Double-Glazed Windows Part I: Feedforward Control" *Applied Acoustics*, 2003; 64: 163-182.

(Continued)

*Primary Examiner* — Marcus Menezes
(74) *Attorney, Agent, or Firm* — Mueting, Raasch & Gebhardt, P.A.

(57) ABSTRACT

Glazing units including a cartridge cavity outside of a seal that is located between the first and second panes to form a closed interior volume within the glazing unit are described herein, along with sashes, panels, window assemblies, and/or doors that may incorporate the glazing units. A control unit provided in a cartridge housing located in the cartridge cavity may be operably connected to one or more connected devices to provide any number of a variety of functions such as, e.g., sound control/production, optical effects, thermal effects, etc.

12 Claims, 7 Drawing Sheets

Related U.S. Application Data

(60) Provisional application No. 61/789,465, filed on Mar. 15, 2013.

(56) References Cited

U.S. PATENT DOCUMENTS

| | | | |
|---|---|---|---|
| 4,878,044 A | 10/1989 | Hickman | |
| 5,805,330 A | 9/1998 | Byker et al. | |
| 5,812,684 A | 9/1998 | Mark | |
| 5,852,284 A | 12/1998 | Teder et al. | |
| 6,023,123 A | 2/2000 | Petiet | |
| 6,369,935 B1* | 4/2002 | Cardinal | E06B 9/24 359/241 |
| 6,671,008 B1 | 12/2003 | Li et al. | |
| 6,865,853 B2* | 3/2005 | Burken | E04L 32/7422 160/135 |
| 6,957,516 B2 | 10/2005 | Allaei | |
| 7,347,608 B2 | 3/2008 | Emde | |
| 7,594,359 B2 | 9/2009 | Keefe et al. | |
| 7,719,751 B2 | 5/2010 | Egerton et al. | |
| 7,805,896 B2 | 10/2010 | Gerhardinger et al. | |
| 7,818,944 B2* | 10/2010 | Hermens | B32B 17/10045 49/141 |
| 7,995,777 B2 | 8/2011 | Yu et al. | |
| 8,213,074 B1* | 7/2012 | Shrivastava | E06B 9/24 345/105 |
| 8,269,627 B2 | 9/2012 | Gore et al. | |
| 8,347,938 B2 | 1/2013 | Schaumberger et al. | |
| 8,375,657 B2 | 2/2013 | Buchwald et al. | |
| 8,669,503 B2 | 3/2014 | Johnson et al. | |
| 8,711,465 B2* | 4/2014 | Bhatnagar | B32B 17/10055 359/275 |
| 8,866,590 B2* | 10/2014 | Wolf | E06B 3/66309 156/60 |
| 2002/0100236 A1* | 8/2002 | Kuipers | E04L 32/7424 52/239 |
| 2004/0031234 A1* | 2/2004 | Emde | F21S 11/00 52/786.11 |
| 2008/0135543 A1* | 6/2008 | Johnson | F24D 13/026 219/522 |
| 2010/0031590 A1* | 2/2010 | Buchwald | E06B 3/66 52/173.3 |
| 2010/0115852 A1* | 5/2010 | Daniels | E06B 3/44 49/504 |
| 2011/0296796 A1* | 12/2011 | Lenhardt | E06B 3/66342 52/786.13 |
| 2012/0316672 A1 | 12/2012 | Nicholson | |
| 2017/0028686 A1* | 2/2017 | Wilson | B32B 17/1055 |

OTHER PUBLICATIONS

Jakob et al., "Active Control of Double-Glazed Windows Part II: Feedback Control" *Applied Acoustics*, 2003; 64: 183-196.

Kaiser et al., "Feedback Control of Sound Transmission Through a Double Glazed Window" *Journal of Sound and Vibration*, 2003; 263: 775-795.

Yu et al, "Acoustic Transmission Control Using Active Panels: An Experimental Study of its Limitations and Possibilities" *Smart Materials and Structures*, Sep. 12, 20007; 16: 2006-2014.

* cited by examiner

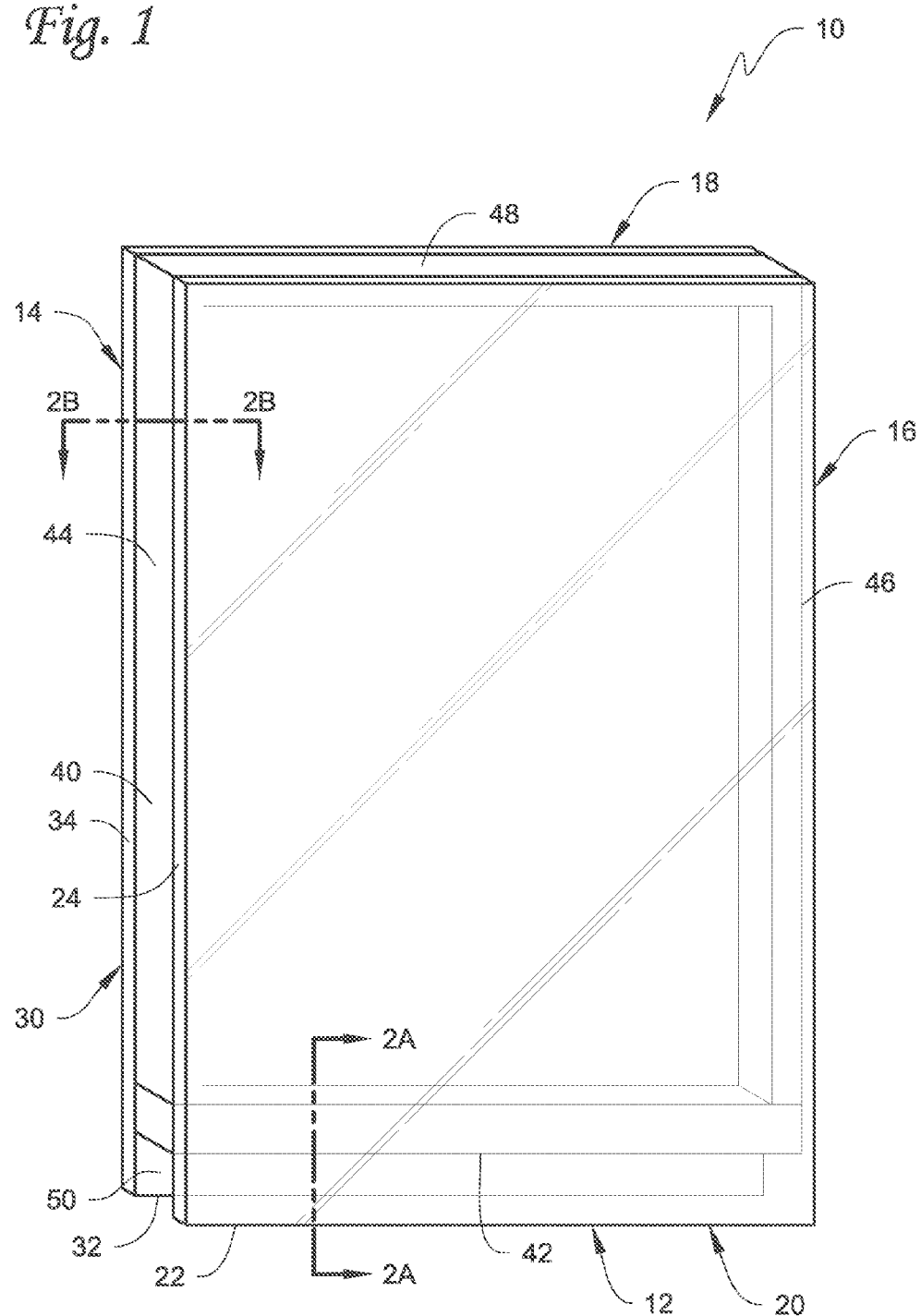

GLAZING UNITS WITH CARTRIDGE-BASED CONTROL UNITS

RELATED APPLICATIONS

This application is a divisional application of U.S. patent application Ser. No. 14/211,267 filed Mar. 14, 2014, which claims the benefit under 35 U.S.C. § 119 of U.S. Provisional Patent Application No. 61/789,465 filed on Mar. 15, 2013 and titled GLAZING UNITS WITH CARTRIDGE-BASED CONTROL UNITS, each of which is incorporated herein by reference in its entirety.

Glazing units with cartridge-based control units located within cartridge cavities in the glazing units, along with sashes, panels, window assemblies and/or doors incorporating the glazing units are described herein.

A wide variety of devices are used in connection with building structures to provide functions such as, e.g., detection and/or emission of sound and/or light, detection of environmental characteristics such as temperature and humidity, security status, etc. Such devices typically require connection to one or more control units and placement of those control units can be challenging depending on the location of the devices, particularly when the devices may be associated with a glazing unit.

SUMMARY

Glazing units with cartridge-based control units located in cartridge cavities in the glazing units along with sashes, panels, window assemblies and/or doors incorporating the glazing units are described herein. In one or more embodiments, one or more connected devices may be operably connected to the control unit in the cartridge cavity. By providing a cartridge-based control unit and one or more connected devices operably connected to the control unit, the glazing units described herein may provide functions not typically associated with glazing units and may do so in the absence of physical connections to other components not attached to the glazing unit.

The glazing units described herein include, in one or more embodiments, a cartridge cavity that is formed along at least a portion of the perimeter of a glazing unit and outside of a seal that is located between the panes of the glazing unit to form a closed interior volume within the glazing unit. In conventional glazing units, the seal separating the panes of the glazing unit (and forming the interior cavity of the glazing unit) are all located at the perimeter of the glazing unit. The glazing units described herein, however, include a cartridge cavity formed by one or more panes that extend beyond the seal along at least a portion of the outer perimeter of the glazing unit, i.e., the seal is setback from the edge of one or more of the panes by a setback distance that defines the cartridge cavities formed in the glazing units. In one or more embodiments, the cartridge cavities described herein may be in the form of a slot formed between the interior surfaces of two panes in the glazing unit.

In one or more embodiments, the control units may be provided in cartridge housings that are located in the cartridge cavities of glazing units as described herein. Providing a cartridge housing in the cartridge cavity may allow for, in one or more embodiments, replacement and/or repair of the control unit without compromising the integrity of the seal used to form a closed interior volume within the glazing unit.

One or more connected devices may be operably connected to the control units in the cartridge cavities. The one or more connected devices may, in one or more embodiments, be configured to deliver electrical energy to the control unit and/or receive electrical energy from the control unit. Examples of some potentially suitable connected devices may include, but are not limited to: electro-acoustic transducers (e.g., speakers, microphones, etc.), ultrasonic and/or infrasonic emitters/detectors, electro-optical transducers, environmental sensors (for, e.g., sensing one or more environmental characteristics such as temperature, humidity, light intensity, air pressure, etc.), thermal devices (e.g., resistance heating elements, etc.), electro-optical transducers (e.g., devices configured to control the passage of light through a window assembly, display information and/or images, etc.), security devices (e.g., lock status sensors (e.g., such as those described in U.S. Pat. No. 8,269,627 to Gore et al.), motion sensors, glass breakage sensors, position sensors, etc.), etc.

The one or more connected devices as described herein may be operably connected to a control unit in a cartridge housing located in the cartridge cavity by one or more of the following connections: physical connectors (e.g., wires, conductive traces, conductive pins, etc.), optically (using, e.g., infrared light, etc.), through one or more wireless communication protocols (e.g., Bluetooth, ZigBee, a wireless local area network (WLAN), etc.), etc. In one or more embodiments, the one or more connected devices may be operably connected to the control unit in a connection that is configured to deliver electrical energy to a control unit and/or receive electrical energy from a control unit.

In one or more embodiments, the one or more connected devices may be attached to and/or contained within the glazing unit. In one or more embodiments, the one or more connected devices may be attached to and/or contained within a sash, panel, window assembly, and/or door containing the glazing unit (with the sash, panel, window assembly, and/or door being used in an interior or exterior location). In one or more embodiments, the one or more connected devices may be attached to and/or contained within the cartridge housing that also contains the control unit.

In one or more embodiments in which two or more connected devices are used with a glazing unit, two or more of the connected devices may be of the same type (e.g., the two or more connected devices used in connection with a glazing unit may perform the same function). In one or more alternative embodiments in which two or more connected devices are used with a glazing unit, two or more of the connected devices may be of different types (e.g., one connected device may perform a first function and another connected device may perform a second (different) function).

In one aspect, one or more embodiments of the glazing units described herein may include a first pane comprising an interior surface and an exterior surface along with a perimeter that comprises a cavity edge and a glazing unit edge; a second pane comprising an interior surface facing the interior surface of the first pane and an exterior surface facing away from the first pane, the second pane further comprising a perimeter that comprises a cavity edge and a glazing unit edge; a seal located between the first pane and the second pane, wherein the seal defines a closed interior volume located between the first pane and the second pane; a cartridge cavity located outside of the seal between the cavity edge of the first pane and the seal, wherein the cartridge cavity is located adjacent the interior surface of the first pane between the cavity edge of the first pane and the seal, and wherein the cartridge cavity comprises a first setback distance measured between the seal and the cavity edge of the first pane, and further wherein a second setback distance measured between the seal and the glazing unit edge of the first pane is less than the first setback distance; a control unit contained in a cartridge housing located within the cartridge cavity; and at least one connected device operably connected to the control unit.

In one or more embodiments of the glazing units described herein, the seal is positioned along the glazing unit edges of the first pane and the second pane.

In one or more embodiments of the glazing units described herein, the cavity edge of the second pane extends past the seal such that at least a portion of the cartridge cavity comprises a slot formed between the interior surface of the first pane and the interior surface of the second pane outside of the seal. In one or more embodiments, the cavity edge of the second pane extends past the seal by the first setback distance. In one or more embodiments, the cavity edge of the second pane extends past the seal by a third setback distance that is less than the first setback distance and greater than the second setback distance.

In one or more embodiments of the glazing units described herein, the at least one connected device is attached to the glazing unit.

In one or more embodiments of the glazing units described herein, the at least one connected device is located within the cartridge housing.

In one or more embodiments of the glazing units described herein, the at least one connected device is attached to the first pane and/or the second pane.

In one or more embodiments of the glazing units described herein, the at least one connected device is located within the closed interior volume located between the first pane and the second pane.

In one or more embodiments of the glazing units described herein, the at least one connected device is configured to deliver electrical energy to the control unit and/or receive electrical energy from the control unit.

In one or more embodiments of the glazing units described herein, the control unit comprises a capacitive touch control positioned against the interior surface of one of the first pane or the second pane, wherein the capacitive touch control is configured to be operated by touching the exterior surface of the first pane or the second pane proximate the capacitive touch control. In one or more embodiments, the capacitive touch control is located on the cartridge housing.

In one or more embodiments of the glazing units described herein, the control unit comprises a wireless communication module configured to send and/or receive instructions to operate the control unit from a remote device.

In one or more embodiments of the glazing units described herein, the glazing unit further comprises a solar collector configured to convert solar energy to electrical energy and deliver that electrical energy to the control unit, wherein the solar collector is located in the cartridge cavity.

In a second aspect, one or more embodiments of a window assembly or door as described herein may include: a sash defining an inner perimeter; and a glazing unit mounted in the sash, wherein a hidden portion of the glazing unit is hidden from view because it is contained within the sash outside of the inner perimeter, and wherein the glazing unit comprises a viewable portion located within the inner perimeter of the sash. The glazing unit further comprises: a first pane comprising an interior surface and an exterior surface along with a perimeter that comprises a cavity edge and a glazing unit edge; a second pane comprising an interior surface facing the interior surface of the first pane and an exterior surface facing away from the first pane, the second pane further comprising a perimeter that comprises a cavity edge and a glazing unit edge; a seal located between the first pane and the second pane, wherein the seal defines a closed interior volume located between the first pane and the second pane; a cartridge cavity located outside of the seal between the cavity edge of the first pane and the seal, wherein the cartridge cavity is located adjacent the interior surface of the first pane between the cavity edge of the first pane and the seal, and further wherein at least a portion of the cartridge cavity is located in the viewable portion of the glazing unit; a control unit contained in a cartridge housing located within the cartridge cavity, wherein at least a portion of the cartridge housing is located in the viewable portion of the glazing unit; and at least one connected device operably connected to the control unit.

In one or more embodiments of a window assembly or door as described herein, the seal is positioned along the glazing unit edges of the first pane and the second pane.

In one or more embodiments of a window assembly or door as described herein, the cartridge cavity comprises a first setback distance measured between the seal and the cavity edge of the first pane, and further wherein a second setback distance measured between the seal and the glazing unit edge of the first pane is less than the first setback distance. In one or more embodiments, the cavity edge of the second pane extends past the seal such that at least a portion of the cartridge cavity comprises a slot formed between the interior surface of the first pane and the interior surface of the second pane outside of the seal. In one or more embodiments, the cavity edge of the second pane extends past the seal by the first setback distance. In one or more embodiments, the cavity edge of the second pane extends past the seal by a third setback distance that is less than the first setback distance and greater than the second setback distance.

In one or more embodiments of a window assembly or door as described herein, the at least one connected device is attached to the window assembly.

In one or more embodiments of a window assembly or door as described herein, the at least one connected device is located within the cartridge housing.

In one or more embodiments of a window assembly or door as described herein, the at least one connected device is attached to the first pane and/or the second pane of the glazing unit.

In one or more embodiments of a window assembly or door as described herein, the at least one connected device is located within the closed interior volume located between the first pane and the second pane.

In one or more embodiments of a window assembly or door as described herein, the control unit comprises a capacitive touch control positioned against the interior surface of one of the first pane or the second pane, wherein the capacitive touch control is configured to be operated by touching the exterior surface of the first pane or the second pane proximate the capacitive touch control. In one or more embodiments, the capacitive touch control is located on the cartridge housing.

In one or more embodiments of a window assembly or door as described herein, the control unit comprises a wireless communication module configured to send and/or receive instructions to operate the control unit from a remote device.

In one or more embodiments of a window assembly or door as described herein, the glazing unit further comprises a solar collector configured to convert solar energy to electrical energy and deliver that electrical energy to the control unit, wherein the solar collector is located in the cartridge cavity and the viewable portion of the glazing unit.

In one or more embodiments of a window assembly or door as described herein, the at least one connected device is configured to deliver electrical energy to the control unit and/or receive electrical energy from the control unit.

The above summary is not intended to describe every embodiment of the glazing units described herein. Rather, a more complete understanding of the invention will become apparent and appreciated by reference to the following Description of Illustrative Embodiments and claims in view of the accompanying figures of the drawing.

BRIEF DESCRIPTION OF THE VIEWS OF THE DRAWING

FIG. 1 is a perspective view of one illustrative embodiment of a glazing unit as described herein.

DESCRIPTION OF ILLUSTRATIVE EMBODIMENTS

Figure 2A:
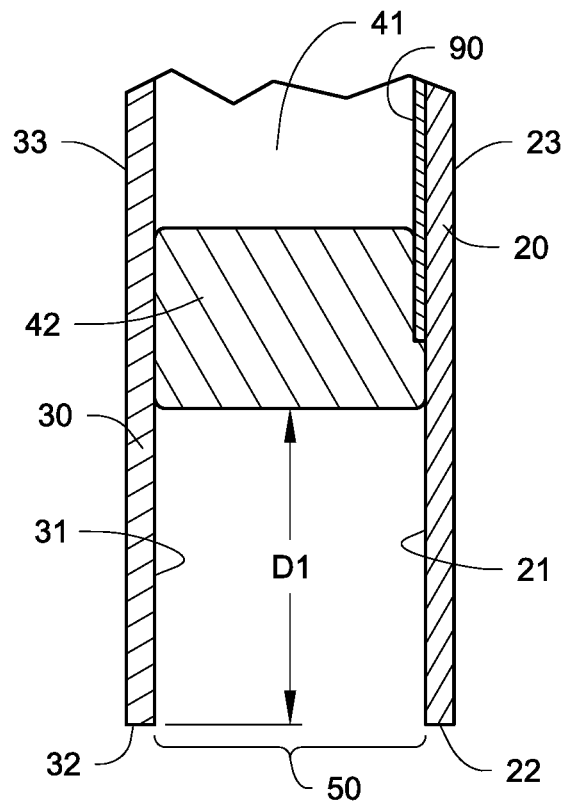
FIG. 2A is an enlarged cross-sectional view of a portion of the glazing unit of FIG. 1 taken along line 2A-2A in FIG. 1.

In the following description of illustrative embodiments, reference is made to the accompanying figures of the drawing which form a part hereof, and in which are shown, by way of illustration, specific embodiments. It is to be understood that other embodiments may be utilized and structural changes may be made without departing from the scope of the present invention.

A perspective view of one illustrative embodiment of a glazing unit 10 is depicted in FIG. 1, the glazing unit including a cavity edge 12, a glazing unit edge 14, a third edge 16, and fourth edge 18. The glazing unit 10 includes a first pane 20 and a second pane 30. Although the illustrative embodiment of glazing unit 10 includes only two panes, one or more alternative embodiments of the glazing units described herein may include one or more additional panes. Cartridge cavities formed in one or more embodiments of glazing units as described herein may be formed outside of any two panes separated by at least one seal, with the two panes located anywhere within a glazing unit that includes three or more panes (e.g., outside of one or more seals located between the outermost panes in a glazing unit having three or more panes, outside of a seal located between any intermediate pane and an outermost pane in a glazing unit having three or more panes, outside of a seal located between any pair of intermediate panes in a glazing unit having four or more panes, etc.). The use of two or more panes of glass used to form a glazing unit using a seal located between the two or more panes is well-known and specific details regarding construction of such glazing units will not be described in further detail herein.

The first pane 20 and the second pane 30 are separated from each other by a seal 40 located between the first pane 20 and the second pane 30. The seal 40 defines a closed interior volume 41 between the first pane 20 and the second pane 30. The closed interior volume 41 may be filled with one or more selected gases at a selected pressure depending on the particular construction of the glazing unit 10. Specific details with respect to the seal 40 and contents and/or pressure of the interior volume 41 of the glazing unit 10 will not be further described herein.

The first pane 20 and the second pane 30 may be constructed of any glass, polymeric material, and combinations of one or more glasses and/or polymeric materials that are suitable for use in glazing units 10. With reference to FIG. 2, the first pane 20 includes an interior surface 21 facing the second pane 30 and an exterior surface 23 facing away from the second pane 30 while the second pane 30 includes an interior surface 31 facing the first pane 20 and the exterior surface 33 facing away from the first pane 20. As a result, the interior surfaces 21 and 31 of, respectively, the first pane 20 and the second pane 30 face the seal 40.

The first pane 20 has a perimeter that, in the depicted embodiment, includes a cavity edge 22 and a glazing unit edge 24. Similar to the first pane 20, the second pane 30 has a perimeter that, in the depicted embodiment, includes a cavity edge 32 and a glazing unit edge 34. In the illustrative embodiment depicted in FIG. 1, glazing unit 10 has a rectilinear shape (as do the first pane 20 and the second pane 30), although it should be understood that the glazing unit 10 (and the panes used to form it) may have any shape that is suitable for a window assembly in a building structure. Examples of some potentially suitable different shapes for glazing units as described herein may include, but are not limited to: triangular, pentagonal, hexagonal, semicircular, etc.

The seal 40 includes, in the depicted embodiment, a first side member 42, second side member 44, third side member 46, and fourth side member 48 to define the shape of the closed interior volume 41 as described herein. In one or more embodiments of the glazing units described herein, the panes used in the glazing units may have an equal number of cavity edges and glazing unit edges. In the glazing units described herein, the number of frame members in a frame located between the panes of the glazing unit may, in one or more embodiments, be equal to the number of cavity edges and glazing unit edges of the panes in the glazing unit.

In the illustrative embodiment of glazing unit 10, the first side member 42 of the seal 40 is set back from the cavity edges 22 and 32 of the first and second panes 20 and 30 as seen in both FIGS. 1 and 2A. Because the first side member 42 of the seal 40 is set back from the cavity edges 22 and 32 of the first and second panes 20 and 30, a cartridge cavity 50 is formed between the first pane 20 and the second pane 30. That cartridge cavity 50 can be used to contain a cartridge housing having a control unit located therein. The other edges of the panes 20 and 30 are described herein as glazing unit edges (see, e.g., edges 24 and 34). In one or more embodiments, the members of the seal 40 are essentially flush with the glazing unit edges of the panes 20 and 30 as seen in, e.g., conventional glazing units (and as described in more detail herein).

In one or more embodiments, such as the illustrative embodiment depicted in FIGS. 1 and 2A, the cartridge cavity 50 may be in the form of a slot formed between the interior surfaces 21 and 31 of panes 20 and 30 (respectively) in the glazing unit 10. The cartridge cavity 50 of the glazing unit 10 can, therefore, be described as having a first setback distance (D1) measured between the seal 40 (which, in FIG. 2A is the first side member 42) and the cavity edges 22 and 32 of the first and second panes 20 and 30. As described herein, the cartridge cavity 50 may contain at least a portion of a cartridge housing containing a control unit in the glazing units described herein.

Figure 2B:
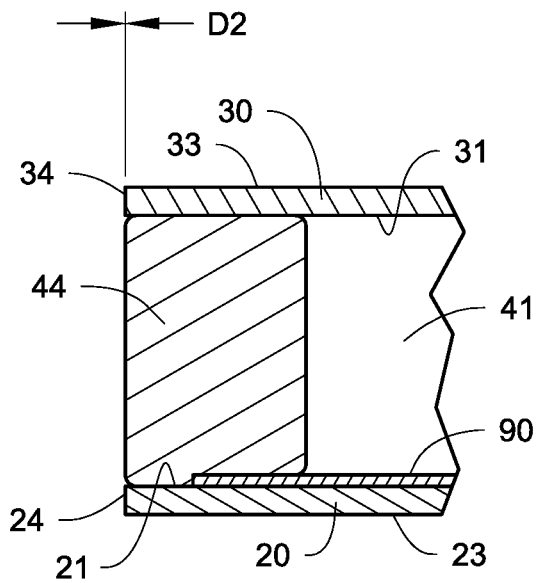
FIG. 2B is an enlarged cross-sectional view of a portion of the glazing unit of FIG. 1 taken along line 2B-2B in FIG. 1.

Referring to the cross-sectional view of FIG. 2B, the construction of the glazing unit 10 along the glazing unit edges 24 and 34 of the first pane 20 and the second pane 30, respectively, is depicted. As seen in FIG. 2B, the second side member 44 of seal 40 is, in large part, flush with the glazing unit edge 24 of the first pane 20 and the glazing unit edge 34 of the second pane 30. As a result, the glazing unit 10 can be described as having a second setback distance D2 measured between the seal 40 (which, in FIG. 2B is the second side member 44) that is less than first setback distance D1 measured between the seal 40 and the cavity edges 22 and 32 of the first and second panes 20 and 30. In the embodiment depicted in FIG. 2B, the second setback distance is essentially zero, i.e., the outer surface of the seal 40 (in the form of second side member 44) is basically flush with the edges 24 and 34 of the first and second panes 20 and 30 (as is typical in conventional glazing units).

Although the illustrative embodiment of glazing unit 10 includes only one cartridge cavity 50, in one or more alternative embodiments of glazing units as described herein, cartridge cavities may be provided along two or more edges of the glazing units (with each of the cartridge cavities formed proximate cavity edges of the panes in the glazing unit). Typically, however, one or more edges of the glazing units described herein may not have a setback capable of forming a cartridge cavity and/or contain a control unit in a cartridge housing as described herein.

Another feature depicted in the cross-sectional views of FIGS. 2A and 2B that may be provided in connection with one or more embodiments of the glazing units described herein is a connected device 90 that may be provided on the interior surface 21 of the first pane 20. Although only one connected device 90 is depicted, one or more alternate embodiments of the glazing units described herein may include any selected number of connected devices. Also, although depicted on the interior surface 21 of the first pane 20, it should be understood that the glazing units described herein could also include one or more on the exterior surface 23 of the first pane 20 and/or on the second pane 30 (where the connected devices could be located on the interior surface 31 and/or the exterior surface 33). As discussed herein, potentially suitable connected devices may include, but are not limited to: electro-acoustic transducers, ultrasonic and/or infrasonic emitters/detectors, electro-optical transducers, environmental sensors, thermal devices, electro-optical transducers, security devices, etc.

One potential class of connected devices that may be used in connection with the glazing units described herein may be described as transducers. As used herein, a transducer is a connected device that is operably connected to a control unit and is configured to perform one or more of a variety of functions such as, e.g., noise control (e.g., noise cancellation), sound production (e.g., speakers), optical effects (e.g., controlling the passage of light, operating to display information and/or images, etc.), thermal effects (e.g., heating one or more panes of a glazing unit, acting as a temperature sensor, etc.), sensing or emitting vibrations outside of the frequency ranges normally associated with sound audible to the human ear, etc. One or more embodiments of the transducers used in the glazing units described herein may be configured to convert electrical energy into one or more other forms of energy (e.g., acoustic energy, light, thermal energy, vibration, etc.) or vice versa, i.e., convert one or more forms of non-electrical energy (e.g., acoustic energy, light, thermal energy, vibration, etc.) into electrical energy.

As used in connection with the glazing units described herein, the connected devices may, in one or more embodiments, be described as electro-optical devices that are configured to control the transmission of light through the glazing unit and/or display information, images, colors, patterns, pictures, any visual display, etc. To accomplish those functions, electro-optical connected devices used in the glazing units and window assemblies described herein may take any of a number of different forms, for example, liquid crystal displays, electronic ink (sometimes referred to as "E-ink"), electroluminescent transducers, organic light emitting diodes (OLED), TFT panels, electrochromic materials, etc.

Furthermore, although the illustrative embodiment of a connected device 90 as depicted in FIG. 2 is shown as a coating on a pane of the glazing unit, in one or more embodiments, the connected devices described herein may, in one or more embodiments, be integrated into one or both of the panes used in a glazing unit as described herein. In still other embodiments, the connected devices may be located between the outermost panes in a glazing unit as described herein (e.g., in the enclosed interior volume located between the outermost panes of the glazing units). In still other embodiments, one or more of the one or more connected devices may be remote from the glazing unit, i.e., not physically attached to the glazing unit at all (e.g., one or more connected devices may be located on or in a sash, window assembly, and/or door incorporating the glazing unit).

Figure 3:
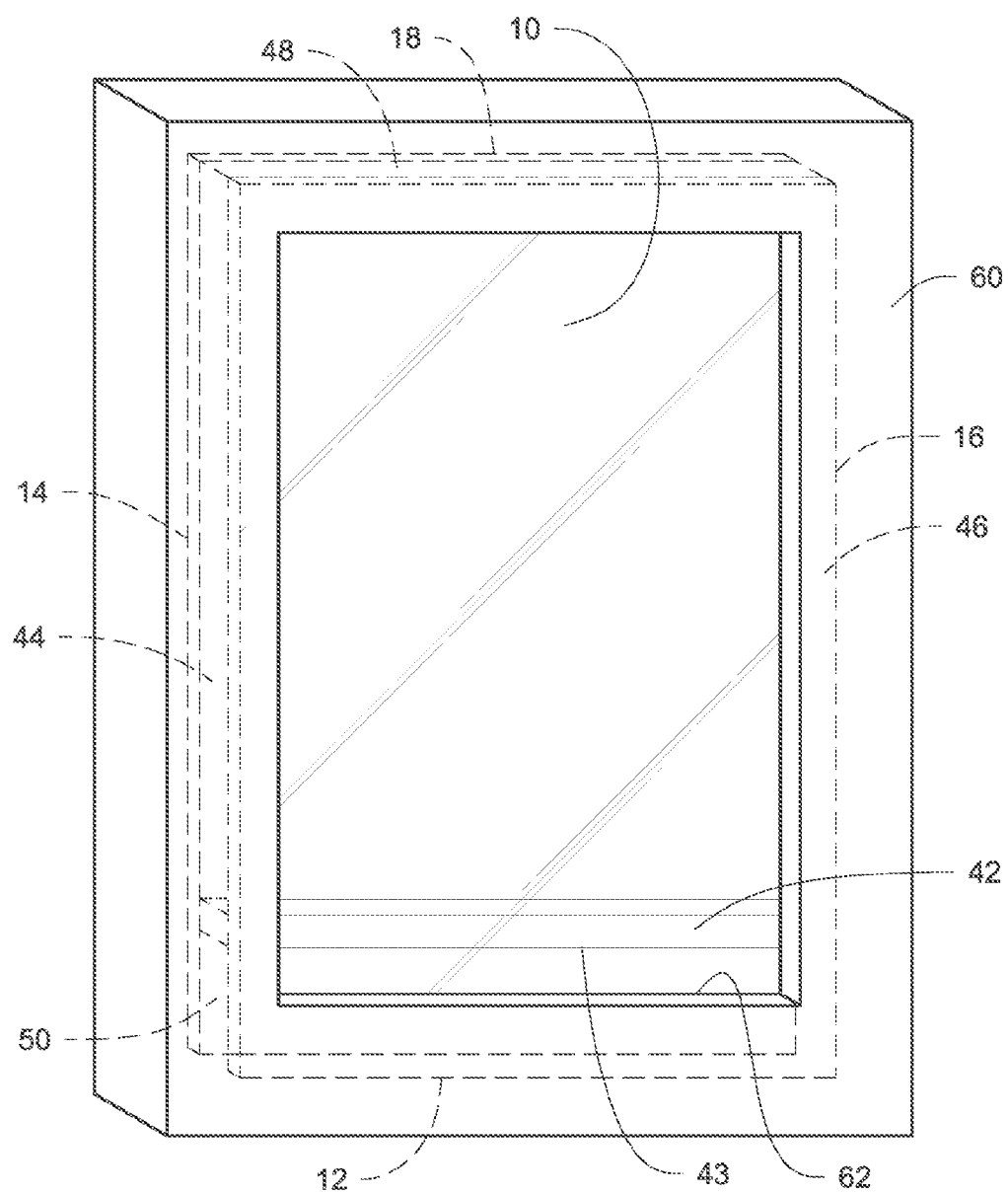
FIG. 3 depicts the glazing unit of FIG. 1 in a sash of a window assembly.

Referring to FIG. 3, the illustrative embodiment of a glazing unit 10 is depicted within a sash 60 that may form a part of a window assembly as described herein (and/or may form a part of a door). The sash 60 has an inner perimeter 62 that defines a viewable area in the sash, where the viewable area is, e.g., the portion of a glazing unit in the sash that can be seen by an observer looking through the sash 60. Because many of the features of the glazing unit 10 will, in one or more embodiments, be outside the viewable area defined by the inner perimeter 62 of the sash 60 and, as such, are hidden within the sash 60, they are depicted in broken lines in FIG. 3. For example, the first side edge 12, second side edge 14, third side edge 16, and fourth side edge 18 of the glazing unit 10 are all depicted in broken lines in FIG. 3 because they will typically be hidden from view outside of the viewable area of the sash 60. Likewise, the second side member 44, third side member 46 and fourth side member 48 of the seal 40 are also, in the depicted embodiment, shown in broken lines in FIG. 3 because they are outside of the viewable area.

As seen in the illustrative embodiment of the window assembly depicted in FIG. 3, the glazing unit 10 includes a cartridge cavity 50 as described above in connection with FIGS. 1, 2A, and 2B. In one or more embodiments, at least a portion of the cartridge cavity 50 is located within the viewable portion of the sash 60. In the illustrative embodiment depicted in FIG. 3, the cartridge cavity 50 is located at the bottom of the sash 60, but in other alternative embodiments the cartridge cavity 50 may be provided along any edge of a glazing unit located within the sash 60. Further, in one or more alternative embodiments, cartridge cavities may be provided along two or more edges of a glazing unit located in a sash, window assembly, and/or door as described herein.

Because at least a portion of the cartridge cavity 50 is located in the viewable area defined by the inner perimeter 62 of the sash 60, the first side seal member 42 of the seal 40 extends through or across the viewable portion of the glazing unit 10 and its outer edge 43 may, in one or more embodiments, be visible within the viewable area.

Figure 4:
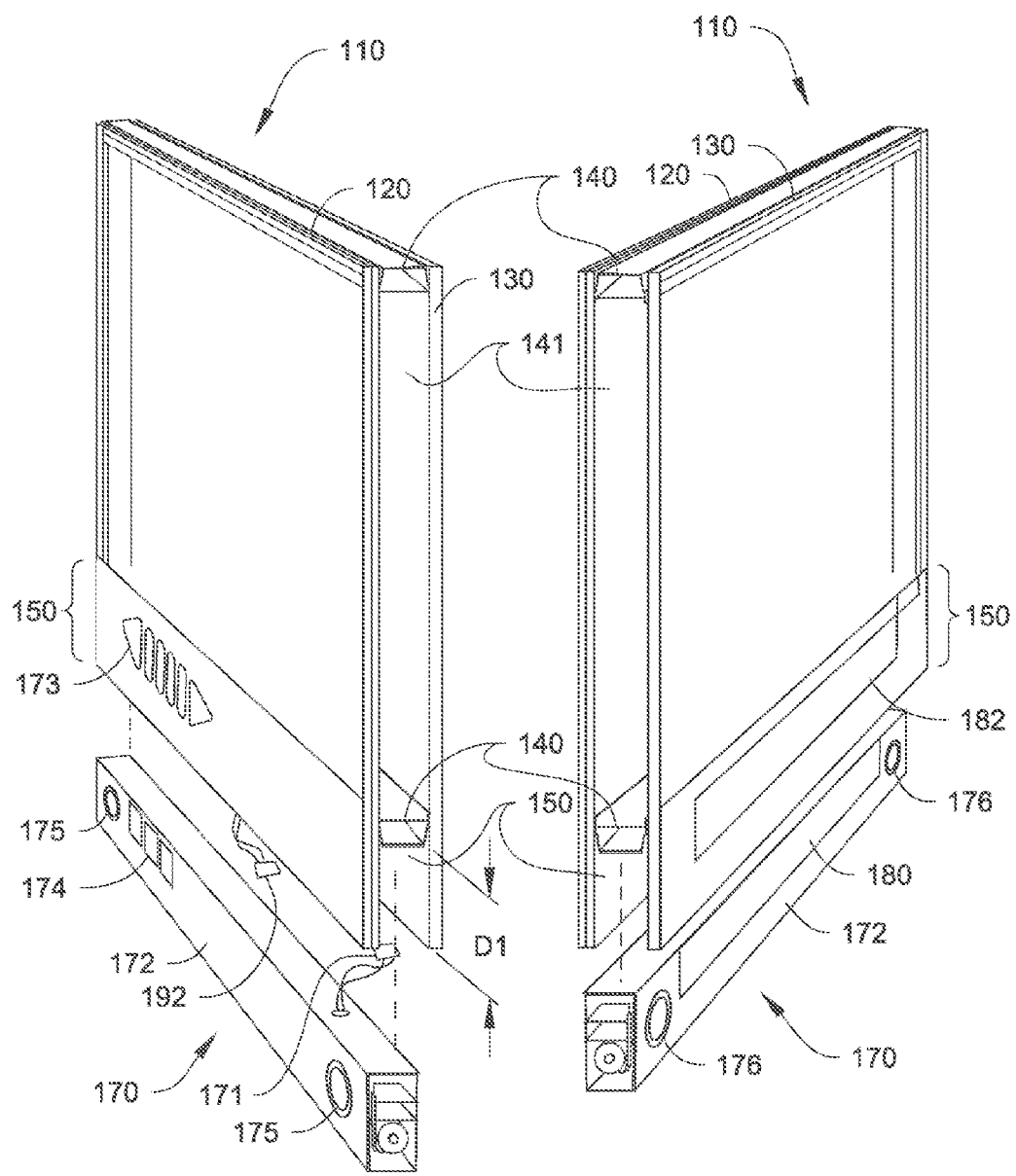
FIG. 4 includes partially exploded left and right side perspective views of one illustrative embodiment of a glazing unit and control unit located in a cartridge housing as described herein.

FIG. 4 includes partially exploded left and right side perspective cross-sectional views of another illustrative embodiment of a glazing unit 110 as described herein including a control unit 170 located in a cartridge housing 172 that is sized to fit within the cartridge cavity 150 formed in the glazing unit 110. The glazing unit 110 includes a first pane 120 and a second pane 130 that are spaced apart from each other by a seal 140 which forms an enclosed interior volume 141 within the glazing unit 110. As described herein, the glazing unit 110 includes a cartridge cavity 150 formed between the first pane 120 and the second pane 130 because the seal 140 is setback from one edge of the glazing unit 110 by a setback distance D1.

The cartridge cavity 150 may, in one or more embodiments, include an opaque coating such as paint or other materials on one or both of panes 120 and 130 to, e.g., limit the visibility of the cartridge housing 172 of the control unit 170 that is located within the cartridge cavity 150. That coating may, however, include one or more apertures 173 that align with one or more controls 174 on the cartridge housing 172 of control unit 170. The controls 174 on the cartridge housing 172 of control unit 170 may be, in one or more embodiments, in the form of capacitive touch controls such that contact with the exterior surface of the first pane 120 in the area of the capacitive touch controls 174 allow a user to control the control unit 170 located within the glazing unit 110.

In one or more alternative embodiments, the control units used in glazing units as described herein may include a wireless communication module that is configured to send and/or receive instructions to operate the control unit from a remote device. For example, the remote device may be a conventional hand-held remote control relying on, e.g., infrared light. In one or more alternative embodiments, the control unit may be wirelessly controlled using, e.g., a smart phone or other wireless control device through any suitable wireless communication protocol (including, but not limited to: Bluetooth, ZigBee, a wireless local area network (WLAN), etc.).

Another optional feature depicted in the glazing unit 110 of FIG. 4 are connectors 171 and 192. Connector 171 may be used to provide a connection between the control unit 170 and one or more connected devices that may be attached to the glazing unit 110. Furthermore, the use of connectors 171 and 192 may allow for removal and replacement of the control unit 170 if needed, while leaving the connected devices in place on or in the glazing unit 110.

The control unit 170 as seen in FIG. 4 also includes connected devices 175 and 176 that, in the depicted embodiment, are attached to the panes 120 and 130 of the glazing unit 110 by being placed in contact with the panes of the glazing unit 110. Because the connected devices 175 and 176 are on opposite sides of the cartridge housing 172, they may, in one or more embodiments, act on the first pane 120 and the second pane 130, respectively. If the connected devices 175 and 176 are in the form of electro-acoustic transducers, they may be configured to deliver acoustic energy to and/or receive acoustic energy from the first pane 120 (using connected device 175) and/or the second pane 130 (using connected device 176).

In one or more embodiments in which the connected devices 175 and 176 are in the form of electroacoustic transducers, the connected devices 175 and 176 may be used as part of a noise control system. In one or more embodiments, the connected device 176 may be used to convert acoustic energy impinging on the second pane 130 to a signal which is then delivered to the control unit 170. As a result, the entire second pane 130 may essentially function as a sound gathering structure to collect and deliver acoustic energy to the connected device 176 (which, in essence, functions as a microphone). The control unit 170 may further be configured to deliver a signal to the connected device 175 which is configured to emit acoustic energy that is transferred to the first pane 120. The acoustic energy emitted by the connected device 175 attached to the first pane 120 may, therefore, be delivered to the first pane 120 where that acoustic energy cancels the acoustic energy detected using the second pane 130 of the glazing unit 110.

Another optional feature depicted in connection with the glazing unit 110 of FIG. 4 is a solar collector 180 that may be, in one or more embodiments, located on the cartridge housing 172 of the control unit 170. The solar collector 180 is, in one or more embodiments, configured to convert solar energy to electrical energy which can be used by the control unit 170. The control unit 170 may, for example, include batteries, capacitors, or any other structures that can be used to store electrical energy from the solar collector 180. In one or more embodiments, such as that depicted in FIG. 4, the area of the second pane 130 occupied by the cartridge cavity 150 may include a coating or other element such that the second pane 130 is opaque. In such embodiments, an aperture 182 may be provided to allow solar energy to reach the solar collector 180 on the cartridge housing 172 of the control unit 170. In one or more alternative embodiments, the solar collector 180 may be separately attached to the glazing unit 110, i.e., the solar collector may or may not be a part of the cartridge housing 172 of the control unit 170.

Figure 5:
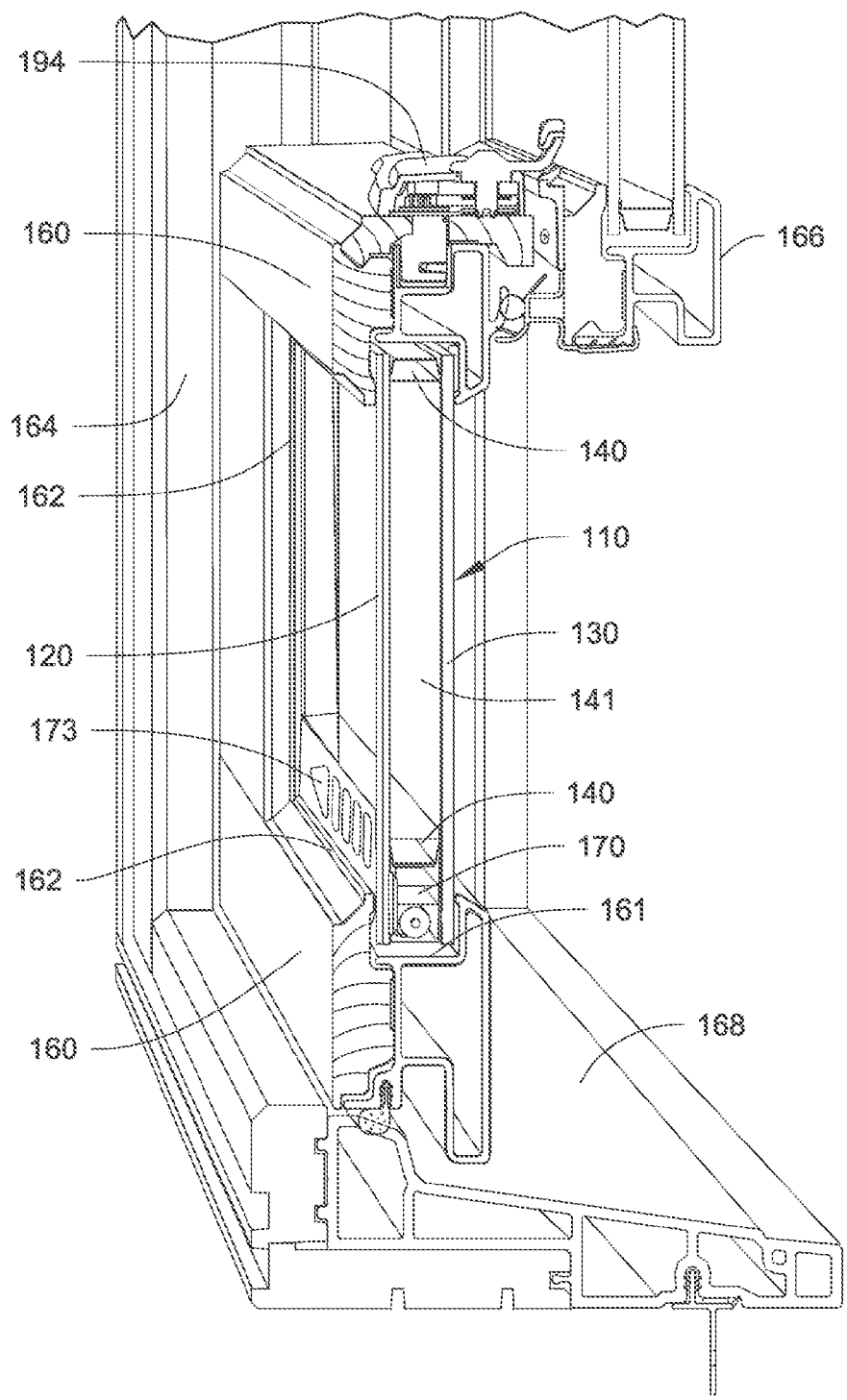
FIG. 5 is a cross-sectional perspective view of another illustrative embodiment of a glazing unit as described herein incorporated into a sash of a window assembly as described herein.

A cross-sectional perspective view of the glazing unit 110 of FIG. 4 as incorporated into a sash 160 that may be used in a window assembly is depicted in FIG. 5. Although the glazing unit 110 is the primary glazing unit in the illustrative embodiment of sash 160, in one or more alternative embodiments, the glazing units described herein may be supplemental glazing units, e.g., incorporated into storm sashes, etc. that may be attached to a sash, panel, window assembly, and/or door in addition to a glazing unit that is already provided in the sash, window assembly, and/or door.

As described herein, the glazing unit 110 in sash 160 includes a first pane 120 and a second pane 130 separated by a seal 140 to form an interior closed volume 141. The glazing unit 110 further includes a control unit 170 located within a cartridge cavity as described above in connection with FIG. 4. Also seen in FIG. 5 are the apertures 173 through which a user may operate capacitive touch controls located on control unit 170 as described herein.

The glazing unit 110 is, in one or more embodiments, at least partially located within a glazing channel 161 provided within sash 160. Glazing channels as provided in sashes are well known and will not be further described herein, nor will the techniques used to attach the glazing unit 110 within the sash be described herein. The sash 160 includes an inner perimeter 162 that, as described above in connection with FIG. 3, defines a viewable area of the glazing unit 110. As seen in FIG. 5, in one or more embodiments the controls used to operate the control unit 170 may be located within that viewable area.

The sash 160 provides, in the depicted embodiment, one sash of a double hung window assembly that includes an upper sash 166. Also seen in FIG. 5 are a side jamb 164 and a sill 168 that also form a part of the window assembly in which a sash 160 is contained. Although the sash 160 is provided as part of a double hung window assembly, it should be understood, that the sashes described herein and the glazing units provided in those sashes may be used in any suitable window assembly, including, e.g., casement windows, fixed sash windows, single hung windows, sliding windows, etc. and/or any suitable door, including, e.g., entry doors, patio doors, French doors, etc.

Although, in one or more embodiments, the one or more connected devices may be attached directly to the glazing unit 110, the connected devices operably connected to the control units in cartridge cavities of glazing units as described herein, the connected devices may, in one or more alternative embodiments, be connected to a sash 160 and/or another part of a window assembly and/or door in which the glazing unit 110 is used. In the illustrative embodiment depicted in FIG. 5, the sash lock 194 may be provided as a connected device that is operably connected to the control unit 170. For example, the sash lock 194 may include one or more sensors used to determine the status of the sash lock 194 (e.g., whether the sash lock 194 is open or closed). Potentially suitable examples of sash locks that may be connected devices as described herein may be described in, e.g., U.S. Pat. No. 8,269,627 to Gore et al.

Figure 6:
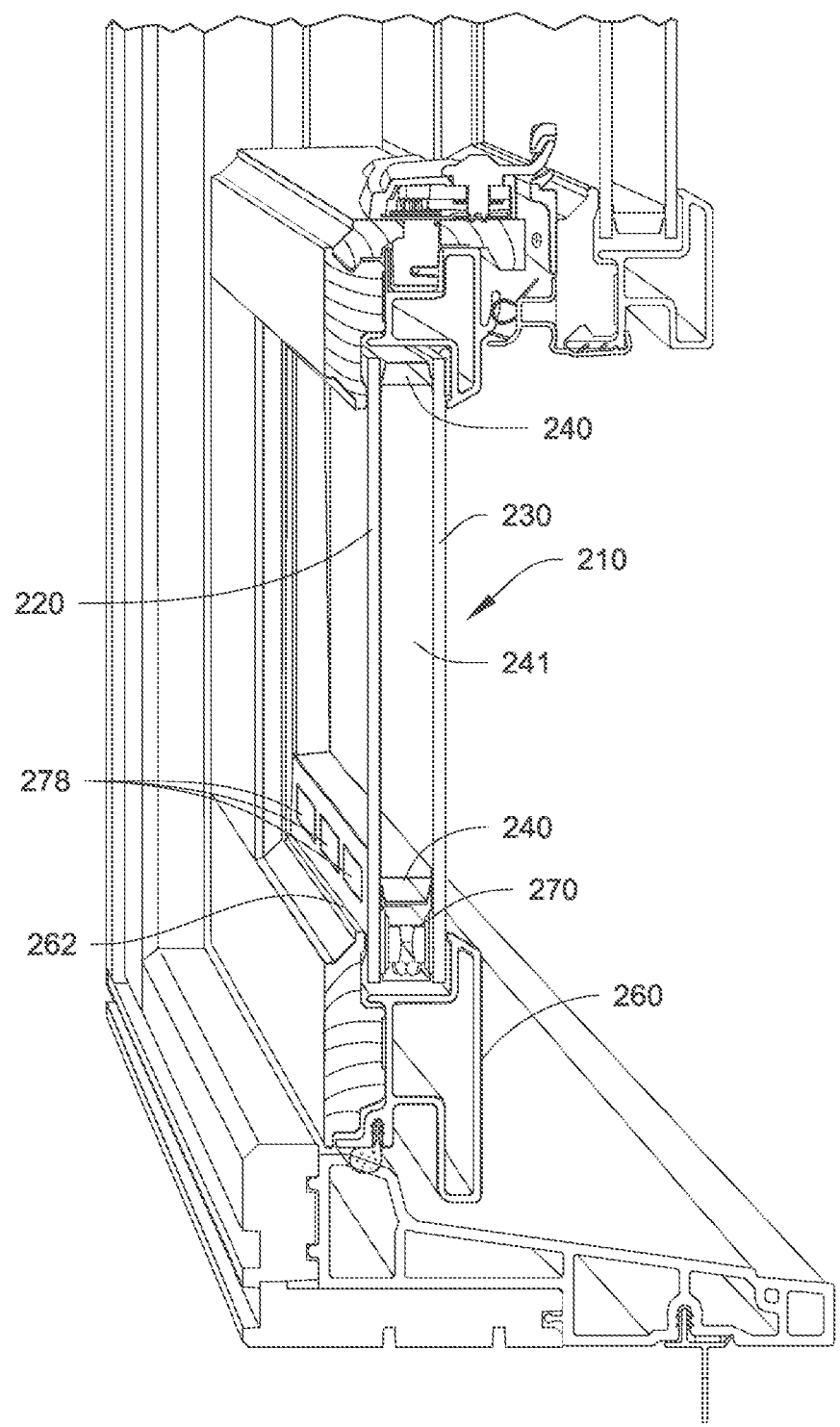
FIG. 6 is a cross-sectional perspective view of another illustrative embodiment of a glazing unit as described herein incorporated into a sash of a window assembly as described herein.

Still another alternative embodiment of a window assembly incorporating a glazing unit 210 in a sash 260 as described herein is depicted in FIG. 6. The glazing unit 210 includes a first pane 220, a second pane 230 and a seal 240 located between the first pane 220 and the second pane 230 to form an enclosed interior volume 241. The glazing unit 210 also includes a control unit 270 located within a cartridge cavity formed along one edge of the glazing unit 210 as described herein. Also as described herein, the sash 260 includes an inner perimeter 262 that defines a viewable area for the glazing unit 210 located in the sash 260.

In the depicted embodiment, the control unit 270 includes one or more displays 278 that may be visible to a user viewing the glazing unit 210 from the side of the first pane 220. The displays 278 may be in a form that delivers information to an observer and, in one or more embodiments, may also function as, e.g., capacitive touch controls used to control the control unit 270 as described herein.

Figure 7:
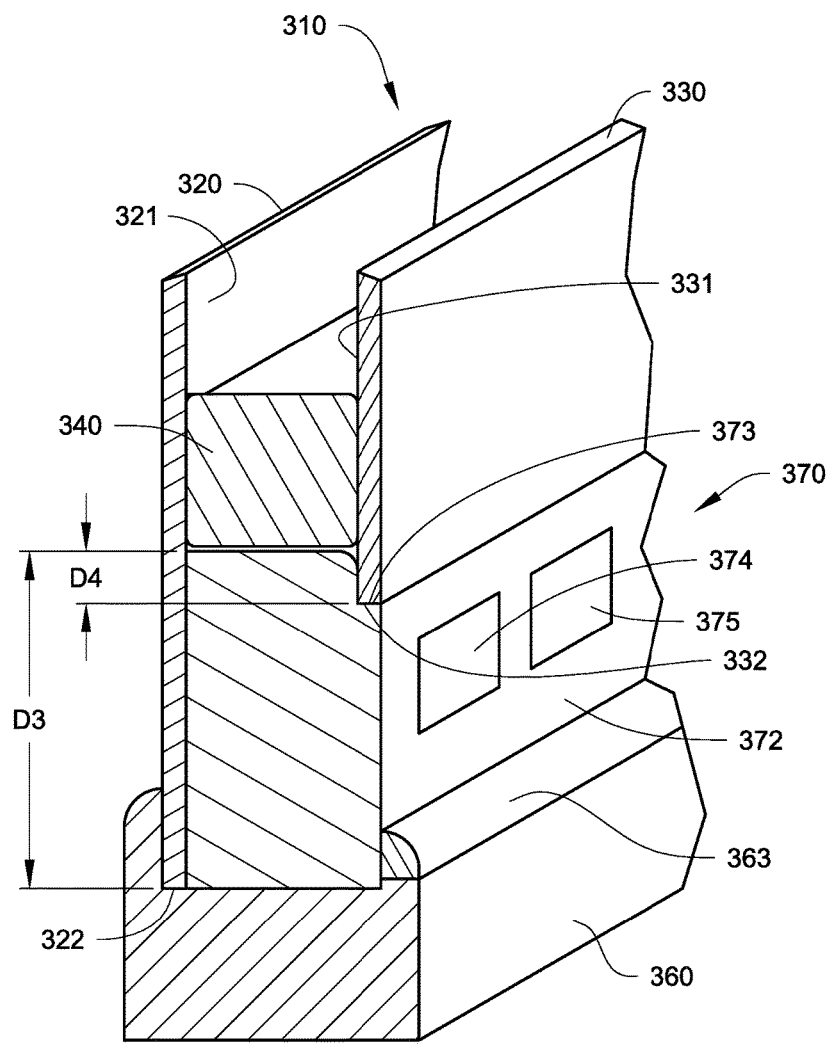
FIG. 7 is a cross-sectional perspective view of another illustrative embodiment of a glazing unit in a sash as described herein.

FIG. 7 is a cross-sectional perspective view of another illustrative embodiment of a glazing unit 310 in a sash 360. Unlike the embodiments described above, however, the embodiment depicted in FIG. 7 includes a cartridge cavity that is not bounded on two sides by the interior surfaces 321 and 331 of the first pane 320 and the second pane 330, respectively. Rather, the cartridge cavity (in which cartridge housing 372 of control unit 370 is located) is located adjacent the interior surface 321 of the first pane 320 between the cavity edge 322 of the first pane 320 and the seal 340.

The second pane 330 of the glazing unit 310 also includes a cavity edge 332. Unlike the illustrative embodiments depicted in, e.g., FIGS. 1, 2A, and 4-6, however, the cavity edge 332 of a second pane 330 does not extend past the seal 340 to the extent that the first pane 320 extends past the seal 340 (as discussed above in connection with the illustrative embodiment depicted in FIGS. 1 and 2A), the cartridge cavity 50 may be in the form of a slot formed between the interior surfaces 21 and 31 of the first and second panes 20 and 30 (respectively).

In embodiments such as that depicted in FIG. 7, the cartridge cavity may be described as having a first setback distance D3 measured between the seal 340 and the cavity edge 322 of the first pane 320. As in the other illustrative embodiments described herein, the glazing unit 310 includes other edges in which the panes 320 and 330 and the seal 340 are aligned with each other such that any distance between the edges of the panes 320 and 330 and the seal 340 is less than the setback distance D3 between the cavity edge 322 of the first pane 320 and the seal 340. In particular, attention is directed to the view seen in FIG. 2B as one illustrative embodiment in which the panes 20 and 30 include glazing unit edges 24 and 34 that are essentially flush with the seal.

In the illustrative embodiment depicted in FIG. 7, the cavity edge 332 of the second pane 330 extends past the seal 340 by a setback distance D4 as depicted in FIG. 7 that is less than the setback distance D3 between the cavity edge 322 of the first pane 320 and the seal 340. Because the setback distance D4 of the cavity edge 332 of the second pane 330 is greater than zero, the first pane 320 and the second pane 330 may be described as forming a cartridge cavity that includes a slot formed between the interior surfaces 321 and 331 of the first pane 320 and the second pane 330. This construction is somewhat different than the cartridge cavity 50 formed between panes 20 and 30 of the illustrative embodiment depicted in connection with, e.g., FIGS. 1 and 2A, although in both illustrative embodiments the glazing units may be described as including a slot formed between two panes of the glazing unit.

In one or more embodiments, the cartridge housing 372 may include a step 373 to accommodate the cavity edge 332 of a second pane 330 with, in the illustrative embodiment depicted in FIG. 7, the cartridge housing 372 extending into the slot formed between the interior surfaces 321 and 331 of the first pane 320 and the second 330. The cartridge housing 372 may also include a connected device 375 and one or more controls 374 that may be used to control the control unit 370.

In one or more alternative embodiments, the setback distance D4 as measured between the cavity edge 332 of the second pane 330 and the seal 340 may be essentially zero, such that the cavity edge 332 of the second pane 330 is essentially flush with the seal 340 (similar to, e.g., the edge 34 of pane 30 as depicted in FIG. 2B). In such an embodiment, the cartridge cavity formed by the glazing unit 310 does not include a slot formed between the interior surfaces 321 and 331 of the first pane 320 and the second pane 330.

In one or more embodiments, the cavity edge 332 of the second pane 330 may be described as aligned with the cavity edge 322 of the first pane 320. In other words, the cavity edge 332 of the second pane 330 may be largely parallel with the cavity edge 322 of the first pane 320, although the edges may not necessarily be perfectly parallel with each other.

Also depicted in FIG. 7 is a trim piece 363 that may be removed from the sash 360 to facilitate removal and/or insertion of the cartridge housing 372 in the cartridge cavity of the glazing unit 310.

The complete disclosure of any patents, patent documents, and publications identified herein are incorporated by reference in their entirety as if each were individually incorporated. To the extent there is a conflict or discrepancy between this document and the disclosure in any such incorporated document, this document will control.

Illustrative embodiments of the glazing units and sashes, panels, window assemblies, and doors including the glazing units are discussed and reference has been made to possible variations. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof. It should also be understood that this invention also may be suitably practiced in the absence of any element not specifically disclosed as necessary herein.

What is claimed is:

1. A glazing unit comprising:
   a first pane comprising an interior surface and an exterior surface along with a perimeter that comprises a cavity edge and a glazing unit edge;
   a second pane comprising an interior surface facing the interior surface of the first pane and an exterior surface facing away from the first pane, the second pane further comprising a perimeter that comprises a cavity edge and a glazing unit edge;
   a seal located between the first pane and the second pane, wherein the seal defines a closed interior volume located between the first pane and the second pane;
   a cartridge cavity located outside of the seal between the cavity edge of the first pane and the seal, wherein the cartridge cavity is located adjacent the interior surface of the first pane between the cavity edge of the first pane and the seal, and wherein the cartridge cavity comprises a first setback distance measured between the seal and the cavity edge of the first pane, and further wherein a second setback distance measured between the seal and the glazing unit edge of the first pane is less than the first setback distance, wherein the cavity edge of the second pane extends past the seal such that at least a portion of the cartridge cavity comprises a slot formed between the interior surface of the first pane and the interior surface of the second pane outside of the seal, and wherein the cavity edge of the second pane extends past the seal by a third setback distance that is less than the first setback distance and greater than the second setback distance;
   a control unit contained in a cartridge housing, wherein a portion of the cartridge housing is located within the slot between the interior surface of the first pane and the interior surface of the second pane, and wherein a portion of the cartridge housing is located outside of the slot formed between the interior surface of the first pane and the interior surface of the second pane; and
   at least one connected device operably connected to the control unit.

2. A glazing unit according to claim 1, wherein the seal is positioned along the glazing unit edges of the first pane and the second pane.

3. A glazing unit according to claim 1, wherein the at least one connected device is attached to the glazing unit.

4. A glazing unit according to claim 3, wherein the at least one connected device is located within the cartridge housing.

5. A glazing unit according to claim 1, wherein the at least one connected device is configured to deliver electrical energy to the control unit, receive electrical energy from the control unit, or deliver electrical energy to the control unit and receive electrical energy from the control unit.

6. A glazing unit according to claim 1, wherein the control unit comprises a wireless communication module configured to receive instructions to operate the control unit from a remote device.

7. A window assembly or door comprising:
   a sash defining an inner perimeter;
   a glazing unit mounted in the sash, wherein a hidden portion of the glazing unit is hidden from view because the hidden portion is contained within the sash outside of the inner perimeter, and wherein the glazing unit comprises a viewable portion located within the inner perimeter of the sash, and wherein the glazing unit further comprises:
      a first pane comprising an interior surface and an exterior surface along with a perimeter that comprises a cavity edge and a glazing unit edge;
      a second pane comprising an interior surface facing the interior surface of the first pane and an exterior surface facing away from the first pane, the second pane further comprising a perimeter that comprises a cavity edge and a glazing unit edge;
      a seal located between the first pane and the second pane, wherein the seal defines a closed interior volume located between the first pane and the second pane;
      a cartridge cavity located outside of the seal between the cavity edge of the first pane and a portion of the seal, wherein the cartridge cavity is located adjacent the interior surface of the first pane between the cavity edge of the first pane and the portion of the seal, and further wherein the portion of the seal and at least a portion of the cartridge cavity are located in the viewable portion of the glazing unit, wherein the cartridge cavity comprises a first setback distance measured between the seal and the cavity edge of the first pane, and further wherein a second setback distance measured between the seal and the glazing unit edge of the first pane is less than the first setback distance, and wherein the cavity edge of the second pane extends past the seal by a third setback distance that is less than the first setback distance and greater than the second setback distance;
      a control unit contained in a cartridge housing located within the cartridge cavity, wherein the cavity edges of the first pane and the second pane extend past the seal such that at least a portion of the cartridge cavity comprises a slot formed between the interior surface of the first pane and the interior surface of the second pane outside of the seal, and wherein a portion of the cartridge housing is located within the slot between the interior surface of the first pane and the interior surface of the second pane, and wherein a portion of the cartridge housing is located outside of the slot formed between the interior surface of the first pane and the interior surface of the second pane; and
      at least one connected device operably connected to the control unit.

8. A window assembly or door according to claim 7, wherein the seal is positioned along the glazing unit edges of the first pane and the second pane.

9. A window assembly or door according to claim 7, wherein the at least one connected device is attached to the window assembly.

10. A window assembly or door according to claim 9, wherein the at least one connected device is located within the cartridge housing.

11. A window assembly or door according to claim 7, wherein the control unit comprises a wireless communication module configured to receive instructions to operate the control unit from a remote device.

12. A window assembly or door according to claim 7, wherein the at least one connected device is configured to deliver electrical energy to the control unit, receive electrical energy from the control unit, or deliver electrical energy to the control unit and receive electrical energy from the control unit.

* * * * *